(12) United States Patent
Kaplan et al.

(10) Patent No.: US 9,213,640 B2
(45) Date of Patent: Dec. 15, 2015

(54) PROMOTING TRANSACTIONS HITTING CRITICAL BEAT OF CACHE LINE LOAD REQUESTS

(71) Applicant: ADVANCED MICRO DEVICES, INC., Sunnyvale, CA (US)

(72) Inventors: David A. Kaplan, Austin, TX (US); Tarun Nakra, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 278 days.

(21) Appl. No.: 13/864,844

(22) Filed: Apr. 17, 2013

(65) Prior Publication Data

US 2014/0317357 A1    Oct. 23, 2014

(51) Int. Cl.
*G06F 12/14* (2006.01)
*G06F 12/08* (2006.01)

(52) U.S. Cl.
CPC ........ *G06F 12/0802* (2013.01); *G06F 12/0862* (2013.01)

(58) Field of Classification Search
CPC .... G06F 12/0802; G06F 12/0862; G06F 12/123
USPC .......................................................... 711/118
See application file for complete search history.

(56) References Cited

U.S. PATENT DOCUMENTS

| 5,564,034 A * | 10/1996 | Miyake ...................... 711/128 |
| 2002/0056022 A1 * | 5/2002 | Leung ........................ 711/106 |
| 2003/0014594 A1 * | 1/2003 | Krimer et al. ............... 711/128 |

* cited by examiner

*Primary Examiner* — Jae Yu

(57) ABSTRACT

A processor includes a cache memory, a first core including an instruction execution unit, and a memory bus coupling the cache memory to the first core. The memory bus is operable to receive a first portion of a cache line of data for the cache memory, the first core is operable to identify a plurality of data requests targeting the cache line and the first portion and select one of the identified plurality of data requests for execution, and the memory bus is operable to forward the first portion to the instruction execution unit and to the cache memory in parallel.

18 Claims, 4 Drawing Sheets

PROMOTING TRANSACTIONS HITTING CRITICAL BEAT OF CACHE LINE LOAD REQUESTS

BACKGROUND OF THE INVENTION

The disclosed subject matter relates generally to processing systems and, more particularly, to promoting transactions that hit the critical beat of a pending cache line load requests.

Processing systems utilize two basic memory access instructions or operations: a store instruction that writes information that is stored in a register into a memory location and a load instruction that loads information stored at a memory location into a register. High-performance out-of-order execution microprocessors can execute memory access instructions (loads and stores) out of program order. For example, a program code may include a series of memory access instructions including loads (L1, L2, . . . ) and stores (S1, S2, . . . ) that are to be executed in the order: S1, L1, S2, L2, . . . . However, the out-of-order processor may select the instructions in a different order such as L1, L2, S1, S2, . . . .Some instruction set architectures require strong ordering of memory operations (e.g. the x86 instruction set architecture). Generally, memory operations are strongly ordered if they appear to have occurred in the program order specified.

A typical computer system includes a memory hierarchy to obtain a relatively high level of performance at a relatively low cost. Instructions of different software programs are typically stored on a relatively large but slow non-volatile storage unit (e.g., a disk drive unit). When a user selects one of the programs for execution, the instructions of the selected program are copied into a main memory, and a processor (e.g., a central processing unit or CPU) obtains the instructions of the selected program from the main memory. Some portions of the data are also loaded into cache memories of the processor or processors in the system.

A cache is a smaller and faster memory that stores copies of instructions and/or data that are expected to be used relatively frequently. For example, central processing units (CPUs) are generally associated with a cache or a hierarchy of cache memory elements. Processors other than CPUs, such as, for example, graphics processing units (GPUs) and others, are also known to use caches.

Store and load instructions typically operate on memory locations in one or more caches associated with the processor. Load instructions may reference a memory location that is not in the cache. In the event of a cache miss, an entry is placed into a missed address buffer (MAB) and a cache line fill is requested. A typical cache line fill occurs over multiple clock cycles or beats. For example, a 64-byte cache line may be divided into 4 beats of 16 bytes. The beat containing the target of the load may be sent first (i.e., the beats may be sent out of order) so that the retrieved data may be forwarded to the load prior to the remaining beats being loaded or the cache line entry being written. After a load has allocated a MAB entry, it typically waits until the fill returns.

A system may employ prefetching to attempt to load cache lines into the cache prior to them being needed by a demand load. A prefetch load initiated by hardware or software may be used to facilitate the cache line fill. In response to the prefetch load missing the cache, an entry may be logged in the missed address buffer. In the meantime, other loads, such as demand loads, can execute and may reference the same cache line. For a load received after the load associated with the MAB entry, the MAB returns a "hit", indicating the cache line in question is already in the process of being filled. Such subsequent loads must wait for the cache line to be written to the cache until they can be executed, because only the load associated with the MAB entry is available for data forwarding.

The goal of prefetching is to fill the cache line prior to a demand load targeting the cache line being serviced. If the cache line can be successfully prefetched, the latency for the later demand load can be reduced because the demand load will not see a cache miss. However, in some cases, the demand load is processed before the cache line fill for the prefetch load can be completed, so the demand load is queued behind the prefetch load. The demand load must wait for the cache line fill to complete prior to being serviced. If a prefetch had not been implemented, a cache miss would have been received by the demand load, and it would have been associated with the subsequent MAB entry and would have been eligible for data forwarding for the critical beat. If the demand load is received shortly after the prefetch load, the latency seen by the demand load could be greater with prefetching than it would have been without prefetching.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY OF EMBODIMENTS

The following presents a simplified summary of only some aspects of embodiments of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Some embodiments of the disclosed subject matter are seen in a processor including a cache memory, a first core including an instruction execution unit, and a memory bus coupling the cache memory to the first core. The memory bus is operable to receive a first portion of a cache line of data for the cache memory, the first core is operable to identify a plurality of data requests targeting the cache line and the first portion and select one of the identified plurality of data requests for execution, and the memory bus is operable to forward the first portion to the instruction execution unit and to the cache memory in parallel.

Some embodiments of the disclosed subject matter are seen in a method including receiving a first portion of a cache line of data for a cache memory, identifying a plurality of data requests targeting the cache line and the first portion, selecting one of the identified plurality of data requests for servicing by an instruction execution unit, and forwarding the first portion to the instruction execution unit and to the cache memory.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
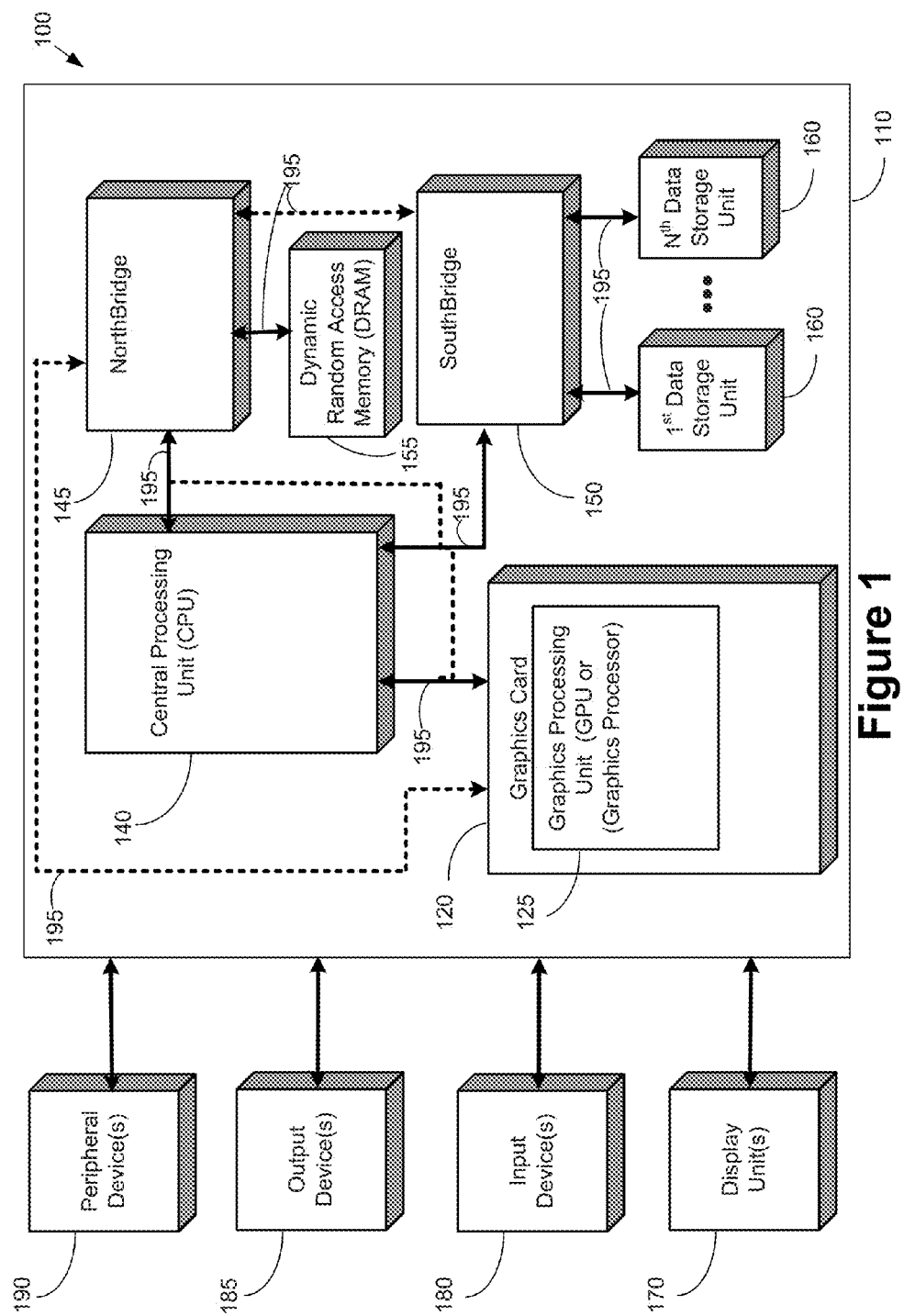
FIG. 1 conceptually illustrates an example of a computer system, according to some embodiments.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the disclosed subject matter shall be described in the context of a computer system 100, according to some embodiments. In some embodiments, the computer system 100 may be a personal computer, a laptop computer, a handheld computer, a netbook computer, a mobile device, a tablet computer, a netbook, an ultrabook, a telephone, a smart television, a personal data assistant (PDA), a server, a mainframe, a work terminal, or the like. The computer system 100 includes a main structure 110 which may be a computer motherboard, system-on-a-chip, circuit board or printed circuit board, a television board, a desktop computer enclosure or tower, a laptop computer base, a server enclosure, part of a mobile device, tablet, personal data assistant (PDA), or the like. In some embodiments, the computer system 100 runs an operating system such as Linux®, Unix®, Windows®, Mac OS®, or the like.

In the illustrated embodiment, the main structure 110 includes a graphics card 120. For example, the graphics card 120 may be an ATI Radeon™ graphics card from Advanced Micro Devices ("AMD"). The graphics card 120 may, in different embodiments, be connected on a Peripheral Component Interconnect (PCI) Bus (not shown), PCI-Express Bus (not shown), an Accelerated Graphics Port (AGP) Bus (also not shown), or other electronic or communicative connection. In some embodiments, the graphics card 120 may contain a graphics processing unit (GPU) 125 used in processing graphics data. In various embodiments the graphics card 120 may be referred to as a circuit board or a printed circuit board or a daughter card or the like.

The computer system 100 shown in FIG. 1 also includes a central processing unit (CPU) 140, which is electronically or communicatively coupled to a northbridge 145. The CPU 140 and northbridge 145 may be housed on the motherboard (not shown) or some other structure of the computer system 100. It is contemplated that in some embodiments, the graphics card 120 may be coupled to the CPU 140 via the northbridge 145 or some other electronic or communicative connection. For example, CPU 140, northbridge 145, GPU 125 may be included in a single package or as part of a single die or "chip". In some embodiments, the northbridge 145 may be coupled to a system RAM (or DRAM) 155 and in some embodiments the system RAM 155 may be coupled directly to the CPU 140. The system RAM 155 may be of any RAM type known in the art; the type of RAM 155 may be a matter of design choice. In some embodiments, the northbridge 145 may be connected to a southbridge 150. In other embodiments, the northbridge 145 and southbridge 150 may be on the same chip in the computer system 100, or the northbridge 145 and southbridge 150 may be on different chips. In various embodiments, the southbridge 150 may be connected to one or more data storage units 160. The data storage units 160 may be hard drives, solid state drives, magnetic tape, or any other writable media used for storing data. In various embodiments, the central processing unit 140, northbridge 145, southbridge 150, graphics processing unit 125, or DRAM 155 may be a computer chip or a silicon-based computer chip, or may be part of a computer chip or a silicon-based computer chip. In one or more embodiments, the various components of the computer system 100 may be operatively, electrically or physically connected or linked with a bus 195 or more than one bus 195.

The computer system 100 may be connected to one or more display units 170, input devices 180, output devices 185, or peripheral devices 190. In various alternative embodiments, these elements may be internal or external to the computer system 100, and may be wired or wirelessly connected. The display units 170 may be internal or external monitors, television screens, handheld device displays, touchscreens, and the like. The input devices 180 may be any one of a keyboard, mouse, track-ball, stylus, mouse pad, mouse button, joystick, scanner or the like. The output devices 185 may be any one of a monitor, printer, plotter, copier, or other output device. The peripheral devices 190 may be any other device that can be coupled to a computer. Example peripheral devices 190 may include a CD/DVD drive capable of reading or writing to physical digital media, a USB device, Zip Drive®, non-volatile memory, external floppy drive, external hard drive, phone or broadband modem, router/gateway, access point or the like.

Figure 2:
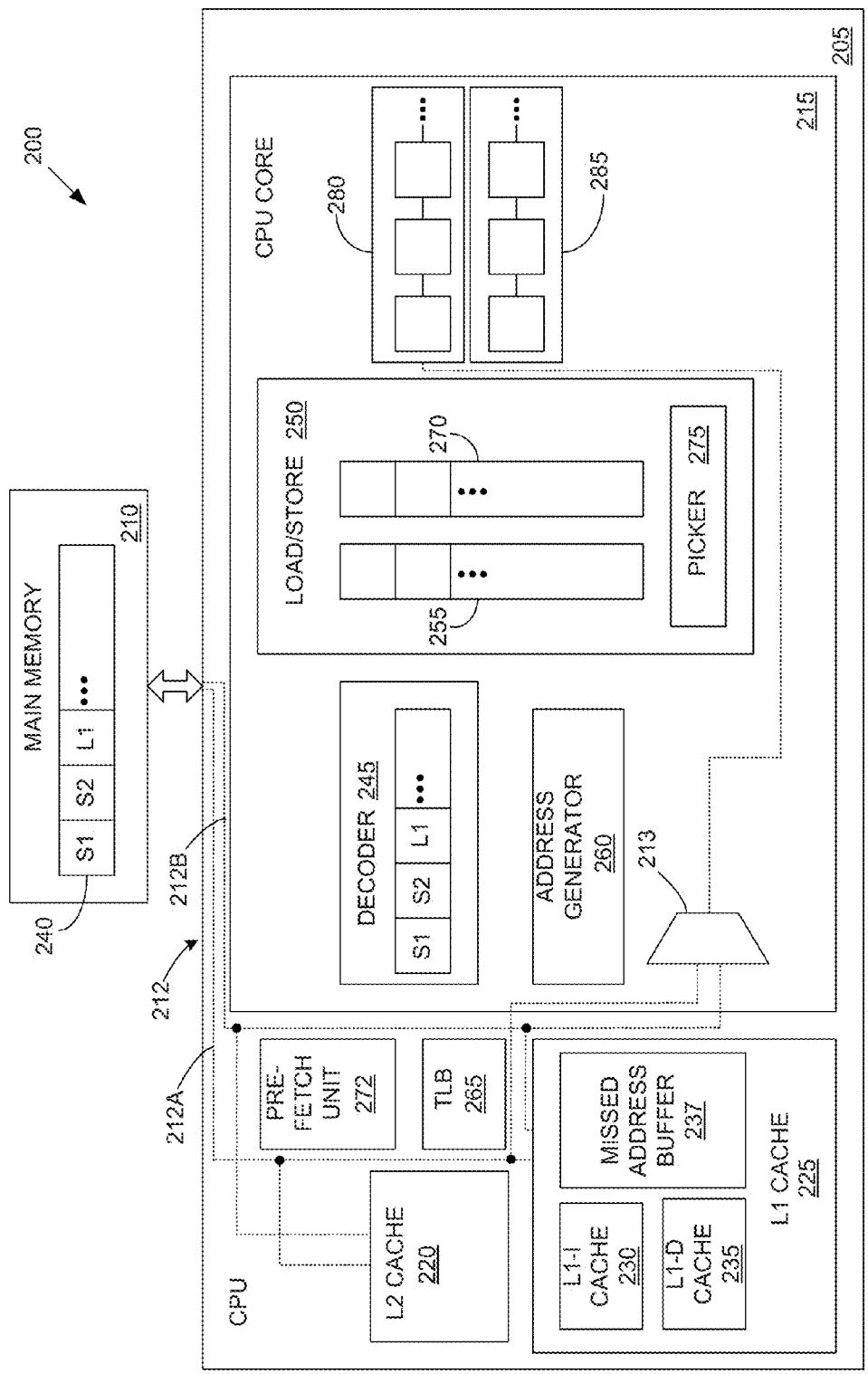
FIG. 2 conceptually illustrates an example of a semiconductor device that may be formed in or on a semiconductor wafer, according to some embodiments.

FIG. 2 conceptually illustrates an example of a portion of a semiconductor device 200 that may be formed in or on a semiconductor wafer (or die), according to some embodiments. The semiconductor device 200 may be formed in or on the semiconductor wafer using well known processes such as deposition, growth, photolithography, etching, planarizing, polishing, annealing, and the like. In some embodiments, the semiconductor device 200 may be implemented in embodiments of the computer system 100 shown in FIG. 1. As illustrated in FIG. 2, the device 200 includes a central processing unit (CPU) 205 (such as the CPU 140 shown in FIG. 1) that is configured to access instructions or data that are stored in the main memory 210. However, as should be appreciated by those of ordinary skill the art, the CPU 205 is intended to be illustrative and alternative embodiments may include other types of processor such as the graphics processing unit (GPU) 125 depicted in FIG. 1, a digital signal processor (DSP), an accelerated processing unit (APU), a coprocessor, an applications processor, and the like. A memory bus 212 interconnects different elements of the CPU 205 to the memory hierarchy (e.g., main memory, caches, etc.). For ease of illustration, not all interfaces and routing paths for the memory bus 212 are shown. Those of ordinary skill are familiar with how such memory interconnections are accomplished.

As illustrated in FIG. 2, the CPU 205 includes at least one CPU core 215 that is used to execute the instructions or manipulate the data. Alternatively, the processing system 200 may include multiple CPU cores 215 that work in concert with each other or independently. The CPU 205 also implements a hierarchical (or multilevel) cache system that is used to speed access to the instructions or data by storing selected instructions or data in the caches. However, persons of ordinary skill in the art having benefit of the present disclosure should appreciate that alternative embodiments of the device 200 may implement different configurations of the CPU 205, such as configurations that use external caches. Caches are typically implemented in static random access memory (SRAM), but may also be implemented in other types of memory such as dynamic random access memory (DRAM).

The illustrated cache system includes a level 2 (L2) cache 220 for storing copies of instructions or data that are stored in the main memory 210. In some embodiments, the L2 cache 220 is 16-way associative to the main memory 210 so that each line in the main memory 210 can potentially be copied to and from 16 particular lines (which are conventionally referred to as "ways") in the L2 cache 220. However, persons of ordinary skill in the art having benefit of the present disclosure should appreciate that alternative embodiments of the main memory 210 or the L2 cache 220 can be implemented using any associativity. Relative to the main memory 210, the L2 cache 220 may be implemented using smaller and faster memory elements. The L2 cache 220 may also be deployed logically or physically closer to the CPU core 215 (relative to the main memory 210) so that information may be exchanged between the CPU core 215 and the L2 cache 220 more rapidly or with less latency.

The illustrated cache system also includes an L1 cache 225 for storing copies of instructions or data that are stored in the main memory 210 or the L2 cache 220. Relative to the L2 cache 220, the L1 cache 225 may be implemented using smaller and faster memory elements so that information stored in the lines of the L1 cache 225 can be retrieved quickly by the CPU 205. The L1 cache 225 may also be deployed logically or physically closer to the CPU core 215 (relative to the main memory 210 and the L2 cache 220) so that information may be exchanged between the CPU core 215 and the L1 cache 225 more rapidly or with less latency (relative to communication with the main memory 210 and the L2 cache 220). Persons of ordinary skill in the art having benefit of the present disclosure should appreciate that the L1 cache 225 and the L2 cache 220 represent an example of a multi-level hierarchical cache memory system. Alternative embodiments may use different multilevel caches including elements such as L0 caches, L1 caches, L2 caches, L3 caches, and the like.

In some embodiments, the L1 cache 225 is separated into level 1 (L1) caches for storing instructions and data, which are referred to as the L1-I cache 230 and the L1-D cache 235, respectively. Separating or partitioning the L1 cache 225 into an L1-I cache 230 for storing only instructions and an L1-D cache 235 for storing only data may allow these caches to be deployed physically closer to the entities that are likely to request instructions or data, respectively. Consequently, this arrangement may reduce contention, wire delays, and generally decrease latency associated with instructions and data. In some embodiments, a replacement policy dictates that the lines in the L1-I cache 230 are replaced with instructions from the L2 cache 220 and the lines in the L1-D cache 235 are replaced with data from the L2 cache 220. However, persons of ordinary skill in the art should appreciate that some embodiments of the L1 cache 225 may not be partitioned into separate instruction-only and data-only caches 230, 235. The caches 220, 225, 230, 235 can be flushed by writing back modified (or "dirty") cache lines to the main memory 210 and invalidating other lines in the caches 220, 225, 230, 235. Cache flushing may be required for some instructions performed by the CPU 205, such as a RESET or a write-back-invalidate (WBINVD) instruction.

Processing systems utilize at least two basic memory access instructions: a store instruction that writes information that is stored in a register into a memory location and a load instruction that loads information started in a memory location into a register. The CPU core 215 can execute programs that are formed using instructions such as loads and stores. In some embodiments, programs are stored in the main memory 210 and the instructions are kept in program order, which indicates the logical order for execution of the instructions so that the program operates correctly. For example, the main memory 210 may store instructions for a program 240 that includes the stores S1, S2 and the load L1 in program order. Persons of ordinary skill in the art having benefit of the present disclosure should appreciate that the program 240 may also include other instructions that may be performed earlier or later in the program order of the program 240. As used herein, the term "instruction" will be understood to refer to the representation of an action performed by the CPU core 215. Consequently, in various alternative embodiments, an instruction may be an assembly level instruction, one of a plurality of micro-ops that make up an assembly level instruction, or some other operation.

Some embodiments of the CPU core 215 include a decoder 245 that selects and decodes program instructions so that they can be executed by the CPU core 215. The decoder 245 can dispatch, send, or provide the decoded instructions to a load/ store unit 250. In some embodiments, the CPU core 215 is an out-of-order processor that can execute instructions in an order that differs from the program order of the instructions in the associated program. The decoder 245 may therefore select or decode instructions from the program 240 and then provide the decoded instructions to the load/store unit 250, which may store the decoded instructions in one or more queues. Program instructions provided to the load/store unit 250 by the decoder 245 may be referred to as "demand requests," "external requests," or the like. The load/store unit 250 may select the instructions in the order L1, S1, S2, which differs from the program order of the program 240 because the load L1 is selected before the stores S1, S2.

In some embodiments, the load/store unit 250 implements a queue structure that includes one or more store instruction queues 255 that are used to hold the stores and associated data and one or more load instruction queues 270. Load data may be indicated by linear addresses and so the linear addresses for load data may be translated into a physical address by the TLB 265. As illustrated in FIG. 2, when a load instruction (such as L1) is picked, the load checks the TLB 265 or the data caches 220, 225, 230, 235 for the data used by the load. The load instruction can also use the physical address to check the store instruction queue 255 for address matches. Alternatively, linear addresses can be used to check the store instruction queue 255 for address matches. If an address (linear or physical depending on the embodiment) in the store instruction queue 255 matches the address of the data used by the load instruction, then store-to-load forwarding can be used to forward the data from the store instruction queue 255 to the load instruction in the load instruction queue 270.

The load/store unit 250 may also handle load or store requests generated internally by other elements in the CPU 205, such as a prefetch unit 272. These requests may be referred to as "internal instructions" or "internal requests" and the element that issues the request may be referred to as an "internal requester." The load or store requests generated internally may also be provided to the load store unit 250, which may place the request in entries in the load instruction queue 255 or the store instruction queue 270. Embodiments of the load store unit 250 may therefore process internal and external demand requests in a unified manner, which may reduce power consumption, reduce the complexity of the logic used to implement the load store unit 250, or reduce or eliminate arbitration logic needed to coordinate the selection of instructions from different sets of queues.

Load or store requests may also be generated by the prefetch unit 272 that prefetches lines into one or more of the caches 220, 225, 230, 235. In various embodiments, the CPU 205 may implement one or more prefetch units 272 that can be used to populate the lines in the caches 220, 225, 230, 235 before the information in these lines has been requested from the cache 220, 225, 230, 235. The prefetch unit 272 can monitor memory requests associated with applications running in the CPU 205 and use the monitored requests to determine or predict that the CPU 205 is likely to access a particular sequence of memory addresses in the main memory. For example, the prefetch unit 272 may detect sequential memory accesses by the CPU 205 by monitoring a miss address buffer that stores addresses of previous cache misses. The prefetch unit 272 may then fetch the information from locations in the main memory 210 in a sequence (and direction) determined by the sequential memory accesses in the miss address buffer and stores this information in the cache so that the information is available before it is requested by the CPU 205. The prefetch unit 272 can keep track of multiple streams and independently prefetch data for the different streams.

Load requests that miss the L1 cache 225 are logged into a missed address buffer (MAB) 237 by the cache control logic. The MAB 237 may be part of the L1 cache 225, as illustrated, or it may be a separate entity external to the L1 cache 225. MAB entries include the physical address of the cache line being filled, and the critical beat number that identifies which subset of the of the cache line include the data for the target address of the load.

The load/store unit 250 includes a picker 275 that is used to pick instructions from the queues 255, 270 for execution by the CPU core 215. As illustrated in FIG. 2, the picker 275 can select a subset of the entries in the queues 255, 270 based on information in registers (not shown in FIG. 2) associated with the entries. The register information indicates whether each entry is ready for execution and the picker 275 adds the entries that are ready to the subset for each queue 255, 270. The picker 275 may select one of the ready entries from the subsets based on a selection policy. In some embodiments, the selection policy may be to select the oldest ready from the subset. For example, the picker 275 may implement or access one or more age matrices that indicate relative ages of the entries in the queues 255, 270. In some embodiments, the picker 275 may implement different selection policies for the different queues 255, 270. The selected ready entries are considered potential candidates for execution.

As illustrated in FIG. 2, the CPU core 215 includes one or more instruction execution units 280, 285 (e.g., pipelines). For example, the execution unit 280 may be allocated to process load instructions and the execution unit 285 may be allocated to process store instructions. However, alternative embodiments of the CPU core 215 may use more or fewer execution pipelines and may associate the execution pipelines with different types of instructions. Load or store instructions selected by the picker 275 may be issued to the execution units 280, 285 for execution.

The memory bus 212 connects the various components of the CPU 205. For example, the data bus 212 may connect the main memory 210, the L2 cache 220, and the L1 cache 225 to the CPU core 215. Data for a current instruction executed by the instruction execution units 280, 285 may come from one of these sources. The memory bus 212 includes a fill bus 212A and a results bus 212B. The fill bus 212 receives data from the main memory 210 or the L2 cache 220 and delivers it to the L1 cache 225. The results bus 212B delivers data output from the L1 cache 225 from reads or flushes. The memory bus 212 may also allow parallel data delivery. For example, data sent to the L1 cache 225 on the fill bus 212A (e.g., by the L2 cache 220 or the main memory 210) because of a cache miss may also be delivered to the instruction execution unit 280 in parallel. A multiplexer 213 that delivers data to the instruction execution unit 280 can select between the fill bus 212A or the results bus 212B as its data source. In this manner, the instruction execution unit 280 need not wait for the data to be loaded into the L1 cache 225 prior to operating on the data. This parallel data transfer is referred to as data forwarding.

Figure 3:
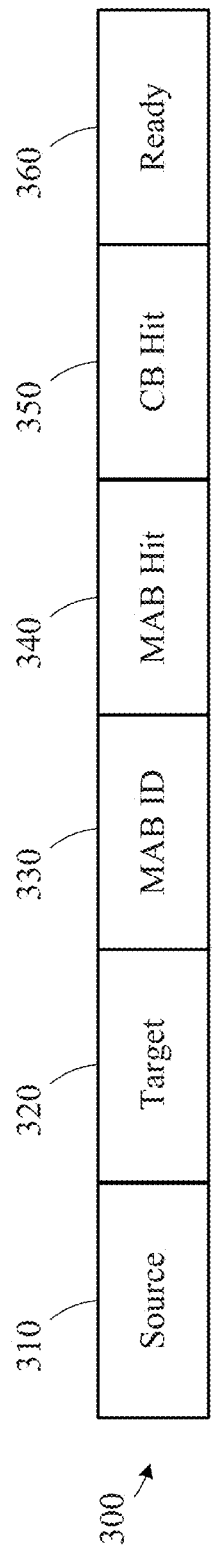
FIG. 3 conceptually illustrates a load queue entry, according to some embodiments.

FIG. 3 illustrates an exemplary entry 300 in the load queue 270. The load queue entry 300 includes a source field 310 indicating the requestor of the load (e.g., core 215, prefetch unit 272, etc.), a target field 320 indicating the physical or virtual address of the memory location holding the data being requested, a missed address buffer ID 330 indicating the corresponding entry in the MAB 237, a missed address buffer hit field 340 indicating that the load is associated with an entry in the missed address buffer 237, a critical beat hit field 350 indicating that the load is also targeting the critical beat number corresponding to the MAB entry, and a ready field 360 indicating that the load is ready to be serviced. The value of the ready field 360 reflects the ready status of its associated instruction. In some embodiments, the value of the ready bit may not include information about other instructions or external conditions that may affect scheduling.

Referring back to FIG. 2, the picker 275 may choose entries from among the subset of entries that are ready for execution. In some embodiments, the picker 275 may select one of the entries from the subset based on the relative ages of the entries, such as the oldest ready entry for possible execution. In systems that include multiple execution pipelines, multiple instructions may be picked by the picker 275. For example, if the processing system includes a load instruction pipeline and a store instruction pipeline, the picker 275 may select the oldest ready entry from the load instruction queue and the oldest ready entry from the store instruction queue for execution in the corresponding pipelines.

In the context of MAB entries for the missed address buffer 237 in the L1 cache 225, multiple load instructions may target the same cache line and the same critical beat (i.e., subset) of the cache line. The first load serviced that references the cache line is associated with the MAB entry instantiated by the cache control logic and determines which beat is the critical beat. Subsequent loads that execute and target the same cache line result in a "hit" in the MAB 237, indicating the cache line in question is already in the process of being filled. The cache control logic also returns a "critical beat hit" signal indicating that the subsequent load also matches the critical beat. MAB hits and critical beat hits are stored in the load queue entry 300. The ready fields 360 for all loads that target the same cache line and the same critical beat may be asserted when the cache line fill starts to return on the fill bus 212A. The picker 275 may then select from one of the eligible loads according to its scheduling policy (e.g., oldest ready, youngest ready, demand over prefetch, etc.) to receive data forwarding prior to the completion of the cache line fill. The picker 275 releases the selected load instruction to the instruction execution unit 280, and the fill bus 212A is selected as the data source for the execution unit 280. The critical beat of the cache line is delivered to the cache 225 and the instruction execution unit 280 in parallel. The other eligible loads can be serviced after the cache line fill is completed and all beats are written into the L1 cache 225.

For example loads A, B, and C reference the same cache line and the same critical beat (CB). If load B executes first, a MAB entry is logged for the cache miss of the cache line. Load C executes next, and finds that not only does it hit this MAB entry (MAB hit), but that it also matches the same critical beat (CB hit). Finally, load A, the oldest load, executes and finds the same MAB and CB hit information. When the cache line fill comes back, all 3 loads assert their ready bit, and the picker 275 may select load A (i.e., the oldest) to complete, allowing it to finish quickly using data forwarding. Loads B and C will then execute later, after the fill has been written to the L1 cache 225.

Persons of ordinary skill in the art having benefit of the present disclosure should appreciate that some embodiments may implement pickers 275 that use different selection policies to choose from among the subset of entries. Example selection policies may include selecting the youngest ready entry, randomly selecting one of the ready entries, selecting a ready entry that has the largest number of dependencies, or using a priority predictor to estimate priorities for picking each of the ready entries and then picking the entry with the highest estimated priority. The alternative embodiments of the picker may use information about the instructions such as the instruction age, instruction dependencies, or instruction priority to select the entries based on the selection policy. In these embodiments, the ready bits "flow" into the picking algorithm, which may then use the instruction information to choose from among the ready entries based on the selection policy.

Requests issued by the prefetch unit 272 or a software prefetcher may be treated as the lowest priority requestor at all times. In some embodiments, the prefetch unit 272 may be assigned a special queue entry with an age assigned according to a prefetcher policy. For example, prefetcher entries may be assigned the oldest age, the youngest age, or they may be allowed to age over time so that they become relatively older than other entries, or other alternatives. In the context of servicing load requests that are associated with a particular MAB entry, prefetch loads may be seen as being younger than demand loads even if they had actually occurred first. In this manner, the picker 275 may prioritize the demand loads over the prefetch loads to allow the demand load to receive the benefit of the data forwarding, rather than making it wait behind the prefetch load.

Figure 4:
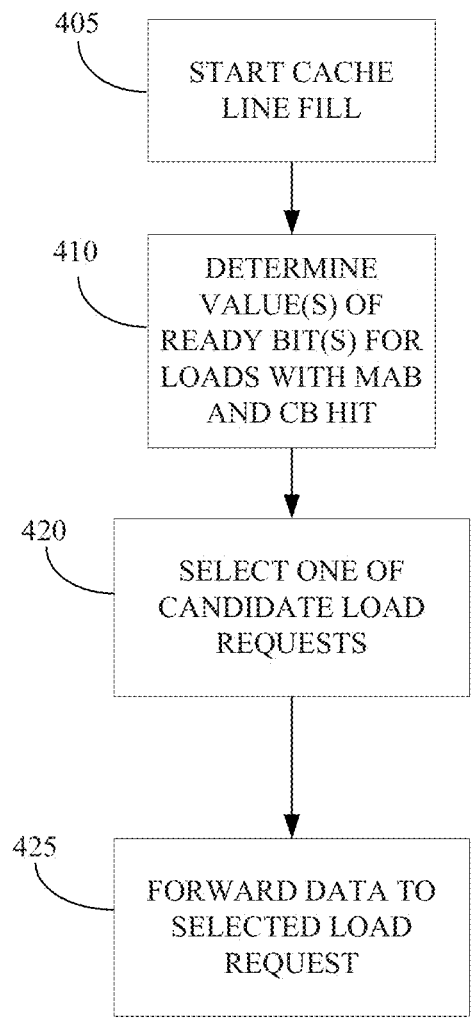
FIG. 4 conceptually illustrates an example of a method for selecting load queue entries for execution, according to some embodiments.

FIG. 4 conceptually illustrates an example embodiment of a method 400 for selecting queue entries for execution, according to some embodiments. A queue, such as the load queue 270, includes entries for instructions that may be executed. The instruction entries are associated with ready bits that indicate whether the corresponding instruction is ready to be executed. A cache line fill is started in block 405. The critical beat of the cache line is received. Values of the ready bits may be determined at block 410 for load instructions based on the MAB and CB hit values 340, 350 stored in the MAB entry 300. One of the candidate load requests is selected based on a selection policy at block 415. In some embodiments, the selection policy may be an oldest ready policy. In some embodiments, prefetch loads may be always designated as being "older" than demand loads. At least a portion of the critical beat data (i.e., including at least the target address) is forwarded to the selected load entry at block 420.

Embodiments of the techniques described herein may have a number of advantages over conventional practice. Benefits of embodiments of the designs described herein may be found in performance, timing, power, or complexity. Demand loads can be prioritized over prefetch loads to reduce the latency of the demand loads for cache misses. Older transactions can be prioritized over younger transactions targeting the same cache line and critical beat.

Embodiments of processor systems that implement load store pickers as described herein (such as the processor system 100) can be fabricated in semiconductor fabrication facilities according to various processor designs. In some embodiments, a processor design can be represented as code stored on a computer readable media. Exemplary codes that may be used to define or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on transitory or non-transitory computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of non-transitory program storage medium or implemented over some type of transmission medium. For example, instructions used to execute or implement some embodiments of the techniques described with reference to FIG. 4 may be encoded on a non-transitory program storage medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

What is claimed:

1. A processor, comprising:
    a cache memory;
    a first core comprising an instruction execution unit; and
    a memory bus coupling the cache memory to the first core, wherein the memory bus is operable to receive a first portion of a cache line of data for the cache memory, the first core is operable to identify a plurality of data requests targeting the cache line and the first portion and select one of the identified plurality of data requests for execution, and the memory bus is operable to forward the first portion to the instruction execution unit and to the cache memory in parallel.

2. The processor of claim 1, further comprising a missed address buffer for storing entries associated with requests to the cache memory for data not present in the cache memory.

3. The processor of claim 2, wherein the first core comprises:
    a load queue for storing a plurality of load requests targeting the cache memory; and
    a picker unit operable to identify a group of load requests in the load queue targeting the cache line and the first portion and select one of the group of load requests for servicing by the instruction execution unit.

4. The processor of claim 3, wherein the load queue includes a load queue entry for each load request, wherein the load queue entry includes a missed address buffer hit field indicating that the load request is associated with an entry in the missed address buffer and a critical beat hit field indicating that the load request is also targeting the first portion of the cache line.

5. The processor of claim 3, wherein the picker unit is operable to select an oldest one of the group of load requests for servicing by the instruction execution unit.

6. The processor of claim 3, wherein the group of load requests includes a prefetch load request and a demand load request, and the picker unit is operable to prioritize the demand load request over the prefetch load request in selecting the one of the group of load requests for servicing by the instruction execution unit.

7. The processor of claim 2, wherein the memory bus is operable to communicate a plurality of separate segments of the cache line, and the first portion comprises a particular segment including the data requested by a load request associated with an entry in the missed address buffer.

8. The processor of claim 1, wherein the memory bus comprises:
    a fill bus operable to receive data for loading into the cache memory;
    a results bus operable to receive data read from the cache memory; and
    a multiplexer operable to select one of the fill bus or the results bus as a data source for the instruction execution unit.

9. A processor, comprising:
    a cache memory for storing cache lines of data;
    a first core, comprising:
        an instruction execution unit for executing instructions;
        a load queue for storing a plurality of load requests targeting the cache memory; and
        a picker unit for selecting particular load requests from the load queue for execution by the instruction execution unit;
    a memory bus coupling the first core to the cache memory;
    a missed address buffer; and
    logic operable to determine if a target address of a first load request in the load queue is not stored in the cache memory and allocate an entry in the missed address buffer for the first load request, the entry in the missed address buffer including an address of a cache line including the target address and a critical beat indicator indicating a segment of the cache line including the target address,
    wherein memory bus is further operable to receive the segment of the cache line corresponding to the critical beat indicator, the picker unit is operable to identify a group of load requests in the load queue associated with the entry in the missed address buffer targeting the cache line and the segment and select one of the group of load requests for servicing by the instruction execution unit, wherein the memory bus is operable to forward at least a portion of the segment to the instruction execution unit.

10. The processor of claim 9, wherein the memory bus is operable to send the segment to the cache memory and the instruction execution unit in parallel.

11. The processor of claim 9, wherein the picker unit is operable to select an oldest one of the group of load requests for servicing by the instruction execution unit.

12. The processor of claim 9, wherein the group of load requests includes a prefetch load request and a demand load request, and the picker unit is operable to prioritize the demand load request over the prefetch load request in selecting the one of the group of load requests for servicing by the instruction execution unit.

13. The processor of claim 9, wherein the load queue includes a load queue entry for each load request, wherein the load queue entry includes a missed address buffer hit field indicating that the load request is associated with an entry in the missed address buffer and a critical beat hit field indicating that the load request is also targeting the segment of the cache line.

14. The processor of claim 9, wherein the memory bus comprises:
  a fill bus operable to receive data for loading into the cache memory;
  a results bus operable to receive data read from the cache memory; and
  a multiplexer operable to select one of the fill bus or the results bus as a data source for the instruction execution unit.

15. A non-transitory computer readable storage device encoded with data that, when implemented in a manufacturing facility, adapts the manufacturing facility to create a processor, comprising:
  a cache memory;
  a first core comprising an instruction execution unit; and
  a memory bus coupling the cache memory to the first core, wherein the memory bus is operable to receive a first portion of a cache line of data for the cache memory, the first core is operable to identify a plurality of data requests targeting the cache line and the first portion and select one of the identified plurality of data requests for execution, and the memory bus is operable to forward the first portion to the instruction execution unit of the first core and to the cache memory in parallel.

16. The non-transitory computer readable storage device of claim 15, wherein the cache memory further comprises a missed address buffer for storing entries associated with requests to the cache memory for data not present in the cache memory.

17. The non-transitory computer readable storage device of claim 16, wherein the first core comprises:
  a load queue for storing a plurality of load requests targeting the cache memory; and
  a picker unit operable to identify a group of load requests in the load queue targeting the cache line and the first portion and select one of the group of load requests for servicing by the instruction execution unit.

18. The non-transitory computer readable storage device of claim 17, wherein the picker unit is operable to select an oldest one of the group of load requests for servicing by the instruction execution unit.

* * * * *